(12) United States Patent
Krenn

(10) Patent No.: US 8,991,159 B2
(45) Date of Patent: Mar. 31, 2015

(54) EXHAUST GAS SYSTEM

(71) Applicant: Bayerische Motoren Werke Aktiengesellschaft, Munich (DE)

(72) Inventor: Christian Krenn, Weyer (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/886,418

(22) Filed: May 3, 2013

(65) Prior Publication Data

US 2013/0276435 A1    Oct. 24, 2013

Related U.S. Application Data

(63) Continuation of application No. PCT/EP2011/005313, filed on Oct. 21, 2011.

(30) Foreign Application Priority Data

Nov. 17, 2010    (DE) .......................... 10 2010 051 691

(51) Int. Cl.

| F01N 3/00 | (2006.01) |
|---|---|
| F01N 3/02 | (2006.01) |
| F01N 3/10 | (2006.01) |
| F01N 3/20 | (2006.01) |
| F01N 3/28 | (2006.01) |
| F01N 13/08 | (2010.01) |

(52) U.S. Cl.

CPC ............ *F01N 3/2892* (2013.01); *F01N 3/2066* (2013.01); *F01N 3/28* (2013.01); *F01N 13/08* (2013.01); *F01N 3/208* (2013.01); F01N 2240/20 (2013.01); Y02T 10/24 (2013.01)

USPC .................. 60/295; 60/317; 60/286; 60/299; 60/301

(58) Field of Classification Search
USPC .................... 60/286, 295, 299, 301, 317, 324
See application file for complete search history.

(56) References Cited

U.S. PATENT DOCUMENTS

| 2009/0038292 A1* | 2/2009 | Plougmann ..................... 60/286 |
| 2009/0266064 A1* | 10/2009 | Zheng et al. .................... 60/317 |
| 2009/0266327 A1* | 10/2009 | Morita et al. ............. 123/184.47 |
| 2009/0282818 A1* | 11/2009 | Keller ............................ 60/317 |

(Continued)

FOREIGN PATENT DOCUMENTS

| DE | 43 36 632 A1 | 1/1995 |
| DE | 198 34 541 A1 | 2/2000 |

(Continued)

OTHER PUBLICATIONS

International Search Report dated Feb. 21, 2012 with English translation (six (6) pages).
German Search Report dated Nov. 11, 2011 with partial English translation (ten (10) pages).

*Primary Examiner* — Kenneth Bomberg
*Assistant Examiner* — Dapinder Singh
(74) *Attorney, Agent, or Firm* — Crowell & Moring LLP

(57) ABSTRACT

An exhaust gas system of an internal combustion engine, in particular for a vehicle, includes an exhaust gas conveying duct, at least one insert disposed in the exhaust gas conveying duct for purifying the exhaust gas, an injection system disposed upstream of the insert in the flow path and a turbulizer disposed between the injection system and the insert. A flow rectifier is provided in the exhaust gas conveying duct between the turbulizer and the insert.

14 Claims, 5 Drawing Sheets

(56) References Cited

U.S. PATENT DOCUMENTS

| | | |
|---|---|---|
| 2010/0083643 A1 | 4/2010 | Hayashi et al. |
| 2010/0107616 A1* | 5/2010 | Janakiraman et al. .......... 60/317 |
| 2010/0126155 A1* | 5/2010 | Garcia et al. .................... 60/317 |
| 2010/0192556 A1* | 8/2010 | Takahashi et al. .............. 60/312 |

FOREIGN PATENT DOCUMENTS

| | | |
|---|---|---|
| DE | 10 2006 019 052 A1 | 10/2007 |
| EP | 1 493 482 A2 | 1/2005 |
| FR | 2 920 472 A1 | 3/2009 |
| WO | WO 2009/024815 A2 | 2/2009 |

* cited by examiner

EXHAUST GAS SYSTEM

CROSS REFERENCE TO RELATED APPLICATIONS

This application is a continuation of PCT International Application No. PCT/EP2011/005313, filed Oct. 21, 2011, which claims priority under 35 U.S.C. §119 from German Patent Application No. 10 2010 051 691.0, filed Nov. 17, 2010, the entire disclosures of which are herein expressly incorporated by reference.

BACKGROUND AND SUMMARY OF THE INVENTION

The invention relates to an exhaust gas system of an internal combustion engine, in particular for a motor vehicle having an exhaust gas conveying duct, at least one insert disposed in the exhaust gas conveying duct for cleaning the exhaust gas, an injection system disposed upstream of the insert in the flow path, and a turbulizer disposed between the injection system and the insert.

In order to clean exhaust gases, the exhaust gas systems for vehicles have inserts, for example, catalysts or diesel particulate filters with upstream catalysts, which filter the pollutants out of the exhaust gas. They have to be regenerated at regular intervals, because otherwise their flow resistance increases unduly fast or, more specifically, their efficiency decreases. This regeneration is generally achieved by burning off the exhaust gases, therefore, by a dramatic increase in the temperature of the exhaust gas, a state that is triggered by introducing an oxidizing agent into the exhaust gas stream. In order to remove the nitric oxides (NOx) from the exhaust gas, a reducing agent has to be injected. This reducing agent can be, for example, a urea/water solution (HWL).

The injection system for such an oxidizing or reducing agent is disposed in the direction of flow at an adequate distance upstream of the catalysts or diesel particulate filters, which are known under the umbrella term as "inserts," so that before the exhaust gas stream impinges on the insert, the oxidizing or reducing agent mixes adequately well with the exhaust gas. In the ideal case the oxidizing or reducing agent mixes completely with the exhaust gas when it impinges on the insert, so that the oxidizing or reducing agent can flow through the insert in such a way that it is uniformly dispersed over the entire cross section and, hence, can regenerate the insert.

In order to shorten the mixing distance between the injection system and the insert (or rather to achieve a reliable thorough mixing), the prior art discloses the use of turbulizers that are disposed in the flow direction downstream of the injection system. Such turbulizers generate powerful turbulence in the exhaust gas stream; and this turbulence, in turn, dramatically increases the rate at which the exhaust gas and the oxidizing or reducing agent are thoroughly mixed.

However, the turbulence generated by the turbulizer can also generate pressure differentials and backflows of the exhaust gas mixture. They appear predominantly in the region directly upstream of the insert, because the exhaust gas system widens in this region due to the large cross section of the insert. Even with good and thorough mixing of the oxidizing or reducing agent with the exhaust gas, this turbulence may cause a non-uniform dispersion of the exhaust gas stream and, as a result, a non-uniform dispersion of the oxidizing or reducing agent over the cross section, so that the flow through the insert is not uniform. A complete regeneration is thus not guaranteed because of this non-uniform dispersion of the oxidizing or reducing agent.

The object of the present invention is to provide an exhaust gas system that enables a more uniform dispersion of the oxidizing or reducing agent and, thus, a more effective regeneration of the insert.

This and other objects are achieved according to the invention in that an exhaust gas system of the genre described above is provided with a flow rectifier in the exhaust gas conveying duct between the turbulizer and the insert. The invention is based on the concept of stabilizing again the exhaust gas flow after a complete thorough mixing of the oxidizing or reducing agent with the exhaust gas, thus, after an adequately long mixing zone in the exhaust gas conveying duct, in that the turbulence generated by the turbulizer is damped or rather filtered out by way of a flow rectifier. The result of this arrangement is that a uniform flow exhibiting no turbulence, or only low turbulence, is generated upstream of the insert, so that the exhaust gas flow can impinge on the insert, disposed downstream of the flow rectifier, in such a way that it is uniformly dispersed over the entire cross section. As a result, the entire cross section of the insert can be uniformly traversed by flow, so that the entire surface area of the insert can be used for cleaning the exhaust gas, and also an effective regeneration of the whole insert can be guaranteed.

The invention is particularly relevant for use with discontinuous oxidizing or reducing agent injection systems. A complete thorough mixing upstream of the inlet cone of the insert can be carried over to the insert only with a flow rectifier. If a flow rectifier is not used, then the recirculation flows may generate a kind of "de-mixing." The result of this phenomenon would be that a complete thorough mixing cannot be "carried over" to the insert.

A new generation of turbulence between the flow rectifier and the insert is prevented by the fact that the distance between the flow rectifier and the insert is designed to be as short as possible. For this reason the flow rectifier is disposed preferably directly upstream of the insert.

In order to enable an exhaust gas cleaning that is as effective as possible with negligible flow resistance, the insert has a significantly larger cross section than the exhaust gas conveying duct. Therefore, the exhaust gas conveying duct empties between the turbulizer and the insert into a cone that compensates for this difference in the cross sections. In particular, this cone is disposed between the flow rectifier and the insert. Hence, the exhaust gas conveying duct does not widen until directly upstream of the insert and after the stabilization of the exhaust gas flow. Because of the rectification of the exhaust gas flow by way of the flow rectifier, there is no new formation of a powerful vortex even with the expansion of the cross section of the exhaust gas conveying duct in the cone.

In order to prevent the formation of a new vortex, the cone is disposed directly upstream of the insert, so that the distance between the flow rectifier and the insert can be made as short as possible. Because of the installation conditions, the exhaust gas system is not installed linearly in the vehicle or rather on the underside of the vehicle. That is, the insert can extend with its longitudinal axis obliquely to the longitudinal axis of the exhaust gas conveying duct. This angular difference is leveled out preferably by way of the cone such that the longitudinal axis of the cone usually coincides with the longitudinal axis of the exhaust gas conveying duct, i.e. extends obliquely to the longitudinal axis of the insert. The widened end of the cone is cut off obliquely and adapted to the geometry of the insert.

The flow rectifier can be formed, for example, in a simple way in that at least one wall, in particular, a sheet metal plate, which extends in the longitudinal direction of the exhaust gas conveying duct in the region of the flow rectifier, is provided; and this wall divides the exhaust gas conveying duct into subducts having a smaller cross section. The cross sections of the subducts are designed to be sufficiently small such that a vortex cannot form in them; and/or the propagation of existing turbulence is prevented, so that an effective stabilization of the exhaust gas flow is achieved with this subdivision.

Therefore, the flow rectifier has preferably a plurality of subducts, which extend in the longitudinal direction of the exhaust gas conveying duct. These subducts are so small that they cannot generate a vortex and/or backflows. These subducts are formed, for example, by use of a plurality of walls extending in the longitudinal direction of the exhaust gas conveying duct.

These walls can intersect, when viewed in the longitudinal direction of the exhaust gas conveying duct, so that, when seen in the direction of flow, they form a pattern that resembles a grid.

In this case, the ducts have a polygonal cross section, preferably a hexagonal cross section. Such a hexagonal cross section that resembles a honeycomb offers the advantage that given an ideal usage of the cross section it is possible to provide ducts of identical cross section, i.e. with the same flow resistance.

The turbulizer can be, for example, a static mixer, so that no moving parts are disposed in the exhaust gas conveying duct.

Such a static mixer is, for example, a swirl generator (also known as a swirl turbine), which can generate a strong swirling flow in the exhaust gas system. This swirling flow extends over the entire cross section of the exhaust gas system or, more specifically, the entire cross section of the exhaust gas conveying duct.

An insert is, for example, an SCR catalyst.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
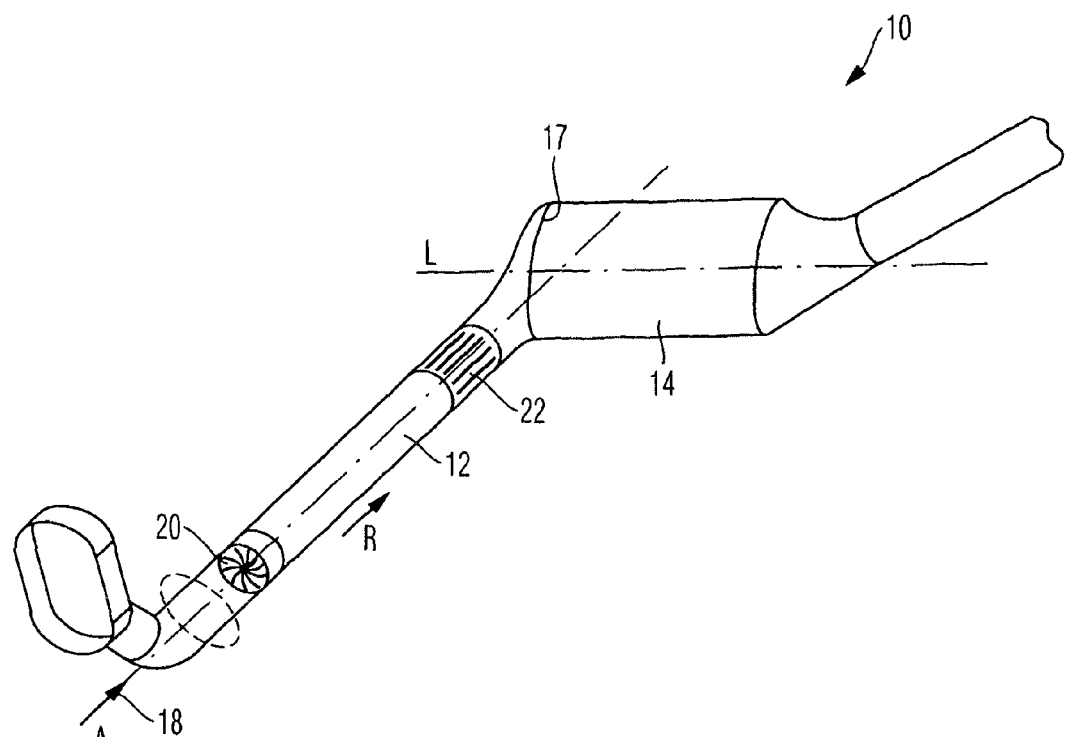
FIG. 1 is a simplified representation of an exemplary exhaust gas system according to the invention.

FIG. 1 shows an exhaust gas system 10 for an internal combustion engine, in particular for a vehicle. In this case the exhaust gas system 10 is shown in a highly stylized form for the sake of elucidating the operating principle. Typically, such an exhaust gas system 10 has a more complex geometry that is a function, for example, of the installation conditions in the vehicle or, more specifically, the installation conditions on the underside of the vehicle. Therefore, for the sake of a better understanding and overview the exhaust gas system 10 is reduced to those components that are essential for the description of the inventive operating principle.

The exhaust gas system 10 has an exhaust gas conveying duct 12, through which the exhaust gas flows in the flow direction R. In this case the main direction of flow, in which an idealized, uniform exhaust gas stream flows through the exhaust gas conveying duct 12 without significant turbulence, is marked R as the flow direction.

The exhaust gas conveying duct 12 has an insert 14 for cleaning the exhaust gas. In this case the cross section of the insert 14 is significantly larger than the cross section of the rest of the exhaust gas conveying duct 12, in order to keep the flow resistance of the exhaust gas system 10 as low as possible and to provide a large surface area for cleaning the exhaust gas. In order to compensate for this cross sectional difference, the exhaust gas conveying duct 12 empties directly upstream of the insert 14 into a cone 16.

Figure 2:
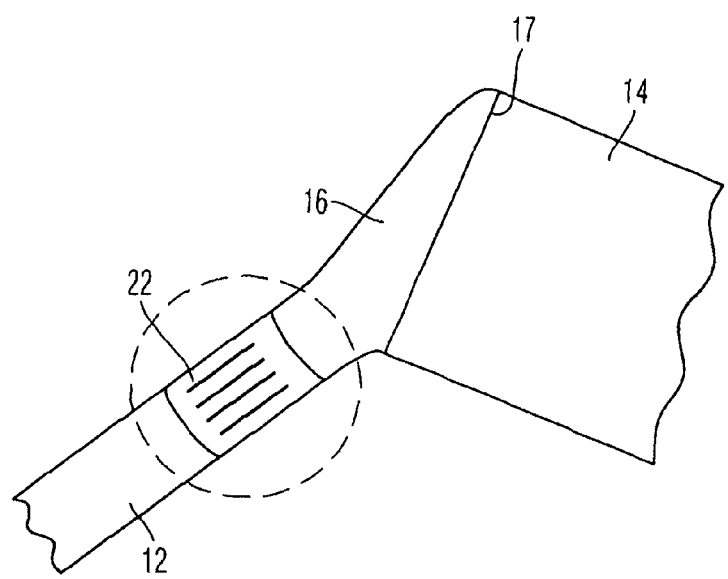
FIG. 2 is a detail view of the exhaust gas system from FIG. 1.

It is very clear in FIG. 1 and, in particular, in FIG. 2 that due to the installation conditions, the longitudinal axis L of the insert 14 extends obliquely to the longitudinal axis A of the cone 16, which in this case is the longitudinal axis of the exhaust gas conveying duct 12. In order to compensate for this angle, the cone 16 is chamfered on the side 17 facing the insert 14 and is adapted to the geometry of the insert 14. This design-induced oblique position of the longitudinal axis L of the insert 14 as well as the cross sectional widening also have, as will be shown in the following, an influence on the flow conditions in the cone 16 or, rather, upstream of the insert 14.

In this case the insert 14 is an SCR catalyst, which has to be regenerated at regular intervals, because otherwise the flow resistance of the insert 14 increases, or more specifically the cleaning efficiency of the SCR catalyst declines. This regeneration is achieved by burning freely, i.e. a dramatic temperature increase, in the insert 14. In order to achieve such a temperature increase, there is upstream an injection system 18, which can inject a reducing agent, for example, a urea/water solution, into the exhaust gas stream.

The injection takes place preferably upstream of a linear section of the duct 12 after a bent section.

In order to bring about a uniform dispersion of the reducing agent in the exhaust gas, a turbulizer 20, in this case a static swirl generator, is provided directly downstream of the injection system 18. This turbulizer causes a powerful vortex to be generated in the exhaust gas stream, and this vortex in turn leads to an intense thorough mixing of the reducing agent with the exhaust gas.

The region of the exhaust gas conveying duct 12 between the turbulizer 20 and the cone 16 serves here as the mixing zone, in which a thorough mixing of the reducing agent with the exhaust gas takes place. The length of this mixing zone is dimensioned in such a way that at the end of the mixing zone, i.e. when the exhaust gas stream impinges on the insert, the reducing agent is thoroughly and completely mixed with the exhaust gas.

However, the powerful turbulence that is generated may also lead to backflows and pressure differentials in the exhaust gas conveying duct 12. These backflows and pressure differentials are enhanced by the cross sectional widening in the cone, so that this region may experience more frequent recirculations, a situation that is apparent, for example, in the idealized representation of the flow conditions in FIG. 6 in the region marked with the numeral 19. In addition, some of the exhaust gas flow impinges earlier on the insert 14 owing to the oblique position of the insert 14, which decelerates this impinging portion of the exhaust gas flow, thereby additionally intensifying the swirl generation. As a result, the exhaust gas flow does not impinge uniformly on the insert, so that it is traversed by the exhaust gas mixture in a non-uniform fashion. As a result, the reducing agent is not uniformly dispersed in the insert, so that a uniform reduction of the nitric oxides of the insert 14 is not guaranteed.

Figure 3:
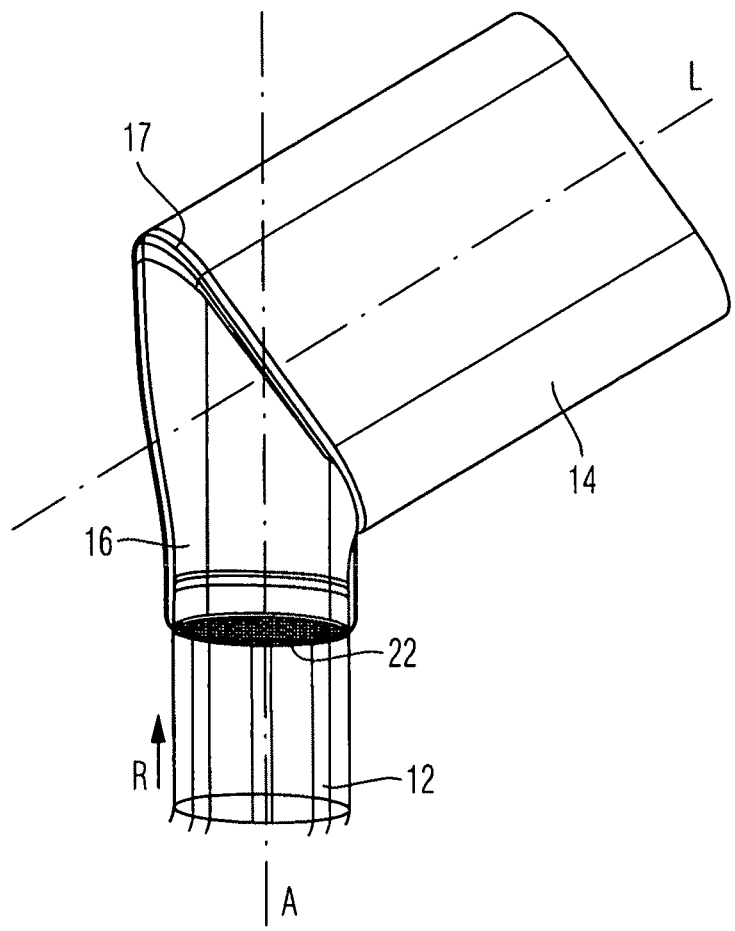
FIG. 3 is a perspective view of the detail view from FIG. 2.
Figure 4:
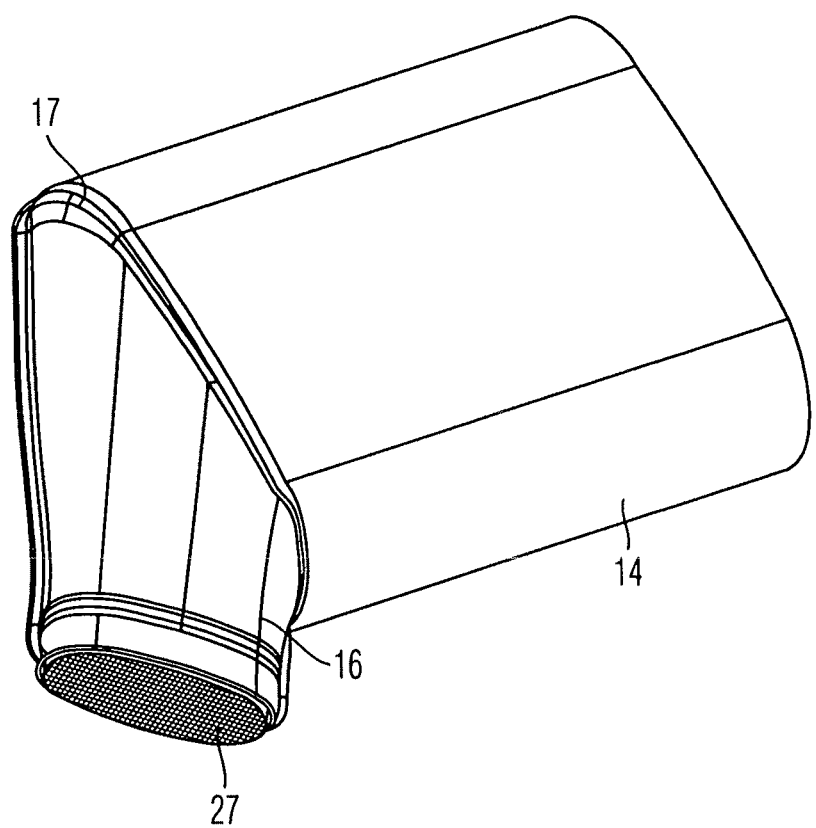
FIG. 4 is a detail view of the insert and the cone of the exhaust gas system from FIG. 1.

For this reason a flow rectifier 22 is provided directly upstream of the cone 16 (see also FIGS. 2 to 4). This flow rectifier 22 serves, as shown in the following, to reduce the turbulence generated by the turbulizer 20 and/or to completely eliminate this turbulence.

Figure 5:
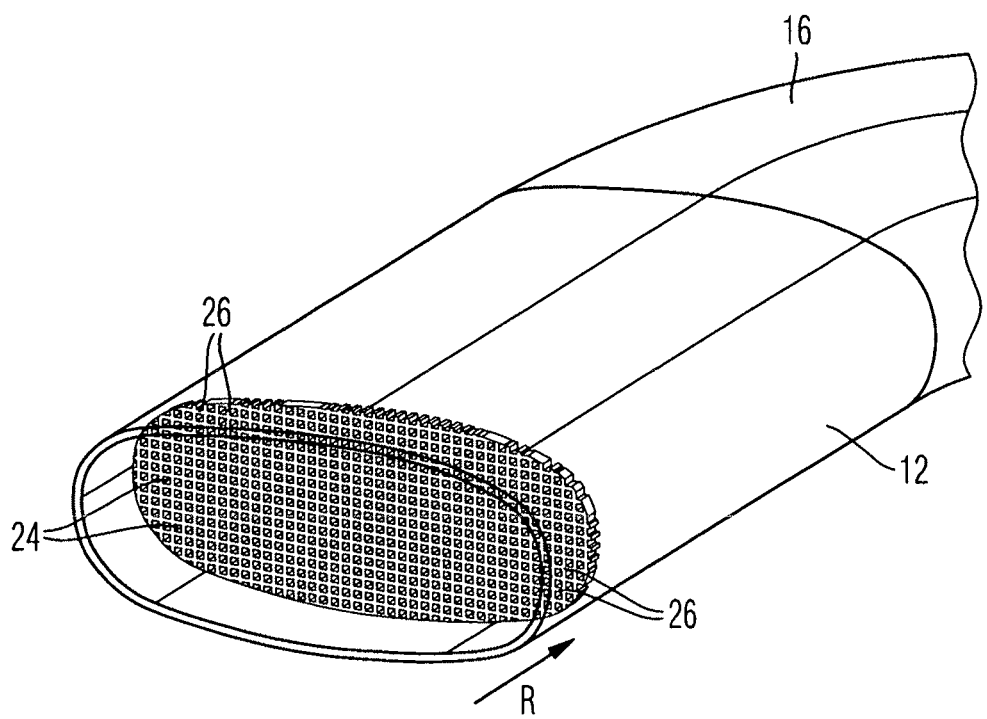
FIG. 5 is a detail view of the flow rectifier of the exhaust gas system from FIG. 1.

It is especially clear from FIG. 5 that the flow rectifier has a plurality of subducts 24 extending in the longitudinal direction of the exhaust gas conveying duct 12. These subducts 24 are formed by a plurality of walls 26 that extend in the longitudinal direction of the exhaust gas conveying duct 12. In this case the walls 26 are arranged more or less parallel to each other and horizontal and/or vertical, so that they define in each case quadrilateral subducts 24. However, the subducts 24 can also have a different cross section. In this case, for example, hexagonal cross sections have turned out to be especially advantageous.

The cross section of these subducts 24 is dimensioned to be small enough that no turbulence and/or backflows can form in these subducts; and/or the propagation of existing turbulence is damped and/or completed prevented. That is, the exhaust gas, or rather the exhaust gas mixture, that flows through the flow rectifier is rectified to some extent, so that a uniform laminar flow issues from the flow rectifier 22 and then impinges on the insert.

Figures 6, 7:
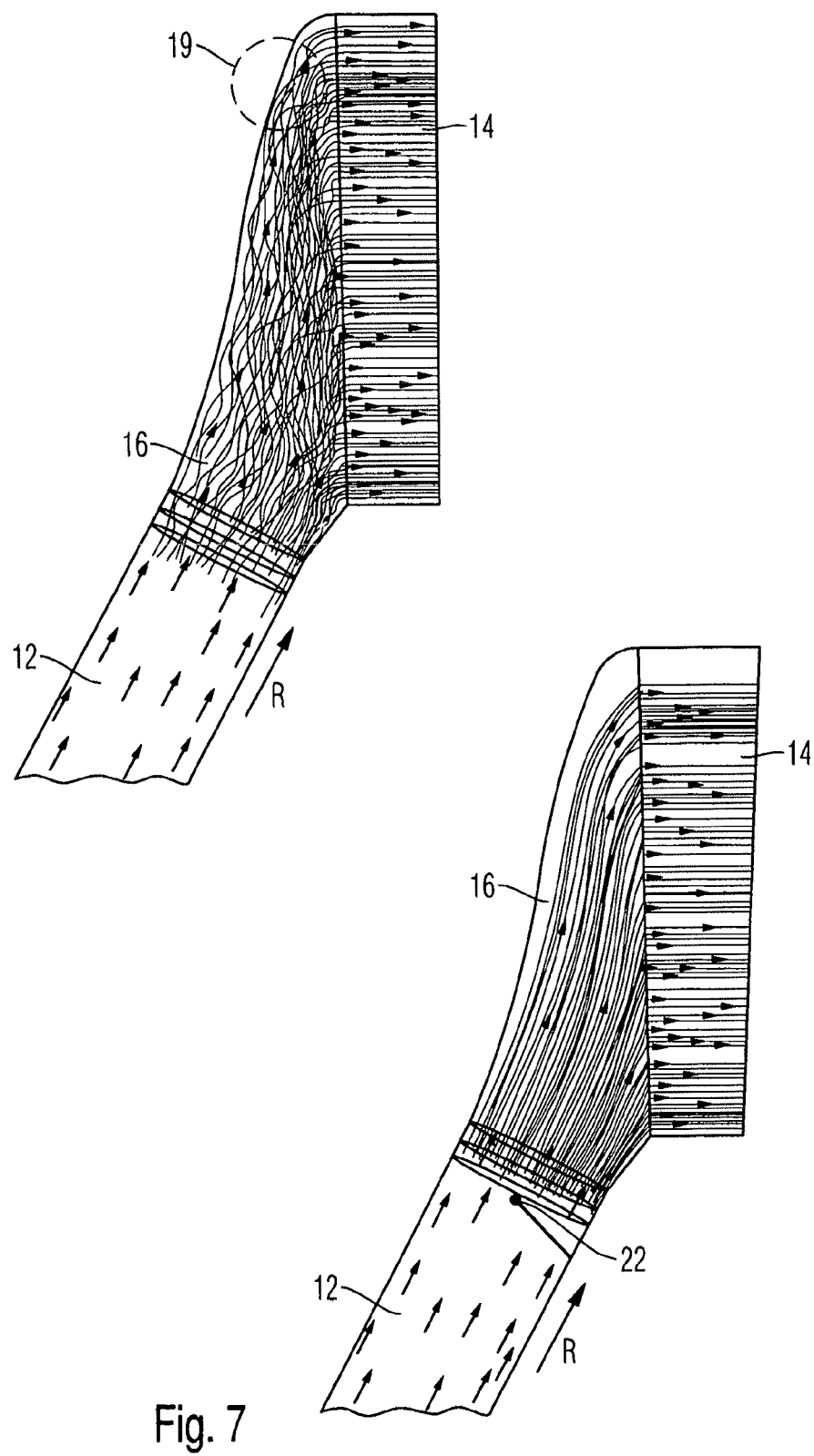
FIG. 6 is an idealized representation of the flow conditions in an exhaust gas system without a flow rectifier.
FIG. 7 is an idealized representation of the flow conditions in the inventive exhaust gas system from FIG. 1 with a flow rectifier.

The flow conditions with such a rectifier 22 are shown in schematic form in FIG. 7. The turbulence that can be seen in the exhaust gas flow upstream of the insert is completely filtered out by the flow rectifier 22, so that downstream of the flow rectifier 22 a uniform, laminar flow is produced. The exhaust gas flow fans out downstream of the flow rectifier 22 and, in particular, in the cone 16. However, owing to the rectification of the exhaust gas flow a recirculation or swirl of the exhaust gas flow can no longer be generated. The exhaust gas flow impinges uniformly dispersed on the entire cross section of the insert 14, so that the entire cross sectional surface area is utilized in an ideal way.

It is also very clear in FIGS. 3 and 4 that the flow rectifier 22 is disposed directly upstream of the cone 16, so that the zone between the flow rectifier 22 and the insert 14 is as short as possible. The flow rectifier 22 could also be disposed in the cone 16 or downstream of the cone 16. In any case, however, an adequately long mixing zone has to be present between the turbulizer 20 and the flow rectifier 22, in order to achieve adequate mixing of the reducing agent and the exhaust gas.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust gas system of a motor vehicle having an internal combustion engine, comprising:
   an exhaust gas conveying duct;
   at least one insert, disposed in the exhaust gas conveying duct, for cleaning exhaust gas from the internal combustion engine;
   a cone disposed in the exhaust gas conveying duct directly upstream of the insert;
   an injection system, disposed upstream of the insert in a flow path of the exhaust gas;
   a turbulizer disposed between the injection system and the insert; and
   a flow rectifier disposed in the exhaust gas conveying duct between the turbulizer and the cone.

2. The exhaust gas system according to claim 1, wherein the cone is disposed directly upstream of the insert and extends with its longitudinal axis obliquely to a longitudinal axis of the insert.

3. The exhaust gas system according to claim 1, wherein the flow rectifier has at least one wall which extends in a longitudinal direction of the exhaust gas conveying duct in a region of the flow rectifier.

4. The exhaust gas system according to claim 3, wherein the at least one wall is formed by a sheet metal plate.

5. The exhaust gas system according to claim 2, wherein the flow rectifier has at least one wall which extends in a longitudinal direction of the exhaust gas conveying duct in a region of the flow rectifier.

6. The exhaust system according to claim 3, wherein a plurality of walls, which extend in the longitudinal direction of the exhaust gas conveying duct, are provided; and
   the plurality of walls being operatively configured to define a plurality of subducts which extend in the longitudinal direction of the exhaust gas conveying duct.

7. The exhaust system according to claim 4, wherein a plurality of walls, which extend in the longitudinal direction of the exhaust gas conveying duct, are provided; and
   the plurality of walls being operatively configured to define a plurality of subducts which extend in the longitudinal direction of the exhaust gas conveying duct.

8. The exhaust system according to claim 5, wherein a plurality of walls, which extend in the longitudinal direction of the exhaust gas conveying duct, are provided; and
   the plurality of walls being operatively configured to define a plurality of subducts which extend in the longitudinal direction of the exhaust gas conveying duct.

9. The exhaust gas system according to claim 6, wherein the plurality of subducts have a polygonal cross section.

10. The exhaust gas system according to claim 9, wherein the polygonal cross section is a hexagonal cross section.

11. The exhaust gas system according to claim 1, wherein the turbulizer is a static mixer.

12. The exhaust gas system according to claim 1, wherein the turbulizer is a swirl generator.

13. The exhaust gas system according to claim 1, wherein the insert is an SCR catalyst.

14. A motor vehicle having an internal combustion engine, comprising:
   an exhaust gas system of the internal combustion engine, the exhaust gas system comprising:
      an exhaust gas conveying duct;
      at least one insert, disposed in the exhaust gas conveying duct, for cleaning exhaust gas from the internal combustion engine;
      a cone disposed in the exhaust gas conveying duct directly upstream of the insert;
      an injection system disposed upstream of the insert in a flow path of the exhaust gas;
      a turbulizer, disposed between the injection system and the insert; and
      a flow rectifier disposed in the exhaust gas conveying duct between the turbulizer and the cone.

* * * * *